(12) United States Patent
Bales et al.

(10) Patent No.: US 8,265,634 B1
(45) Date of Patent: Sep. 11, 2012

(54) WIRELESS SPECTRUM VALUATION

(75) Inventors: Stephen R. Bales, Lee's Summit, MO (US); Syed U. Ahmed, Overland Park, KS (US); Feng Xie, Leawood, KS (US); Vijay Rudraraju, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1220 days.

(21) Appl. No.: 12/045,124

(22) Filed: Mar. 10, 2008

(51) Int. Cl.
*H04W 40/00* (2009.01)

(52) U.S. Cl. ..... 455/446; 455/445; 455/449; 455/452.2; 455/453

(58) Field of Classification Search .......................... None
See application file for complete search history.

(56) References Cited

U.S. PATENT DOCUMENTS

| | | | |
|---|---|---|---|
| 6,129,604 A * | 10/2000 | Maveddat et al. | 455/453 |
| 6,336,035 B1 | 1/2002 | Somoza et al. | |
| 6,393,290 B1 | 5/2002 | Ufongene | |
| 6,801,776 B2 | 10/2004 | Notanii et al. | |
| 7,142,868 B1 | 11/2006 | Broyles et al. | |
| 2003/0054843 A1 | 3/2003 | Notani et al. | |
| 2005/0010468 A1 | 1/2005 | Power | |
| 2005/0265299 A1 | 12/2005 | Franceschini et al. | |
| 2006/0246912 A1 | 11/2006 | De Santis et al. | |
| 2008/0097731 A1 * | 4/2008 | Lanes et al. | 703/2 |

* cited by examiner

*Primary Examiner* — Dai A Phuong (57) ABSTRACT

A wireless spectrum valuation system receives input data. The system processes the input data to identify and display a geographic area with a population density greater than the population density threshold. The system calculates and displays a number of cell sites required for an initial deployment in the identified geographic area and calculates a first number of subscribers per cell site. If the first number of subscribers per cell site is greater than a cell site utilization threshold, then the system calculates and displays an additional number of cell sites required for the initial deployment and recalculates a number of subscribers per cell site. The system calculates a number of carriers required per cell site, calculates a cost for the initial deployment, and calculates and displays a value of a wireless spectrum.

30 Claims, 7 Drawing Sheets

FIGURE 9

WIRELESS SPECTRUM VALUATION

TECHNICAL BACKGROUND

The Federal Communications Commission (FCC) conducts license auctions for the wireless spectrum. In essence, the FCC auctions the rights to transmit signals over specific electromagnetic wavelengths. Companies or individuals that utilize the wireless spectrum, such as wireless telephone companies, bid on licenses for parts of the spectrum. The licenses become the property of the highest bidder.

An issue that arises during a spectrum auction is how to determine how much the spectrum is actually worth to a bidding company. If a company does not know the long-term value of the spectrum for their particular business, then they might overbid and pay more than the licenses are actually worth. Conversely, if the company does not know the long-term value of the spectrum, they might underbid, lose the licenses to another company, and lack the spectrum needed to expand their business.

TECHNICAL SUMMARY

A wireless spectrum valuation system receives input data comprising a population density threshold, a cell site utilization threshold, a carrier threshold, population data, cell site range, average busy hour usage data, and market penetration. The system processes the input data to identify and display a geographic area with a population density greater than the population density threshold. In response to identifying the geographic area, the system calculates and displays a number of cell sites required for an initial deployment in the identified geographic area. In response to determining the number of cell sites required, the system calculates a first number of subscribers per cell site. If the first number of subscribers per cell site is greater than the cell site utilization threshold, then the system calculates and displays an additional number of cell sites required for the initial deployment and then calculates a second number of subscribers per cell site. In response to determining the second number of subscribers per cell site, the system calculates the number of carriers required per cell site. The system then calculates a cost for the initial deployment based on the number of cell sites required and the number of carriers required. The system then calculates and displays the value of a wireless spectrum based on the cost of the initial deployment.

DETAILED DESCRIPTION

Figure 1:
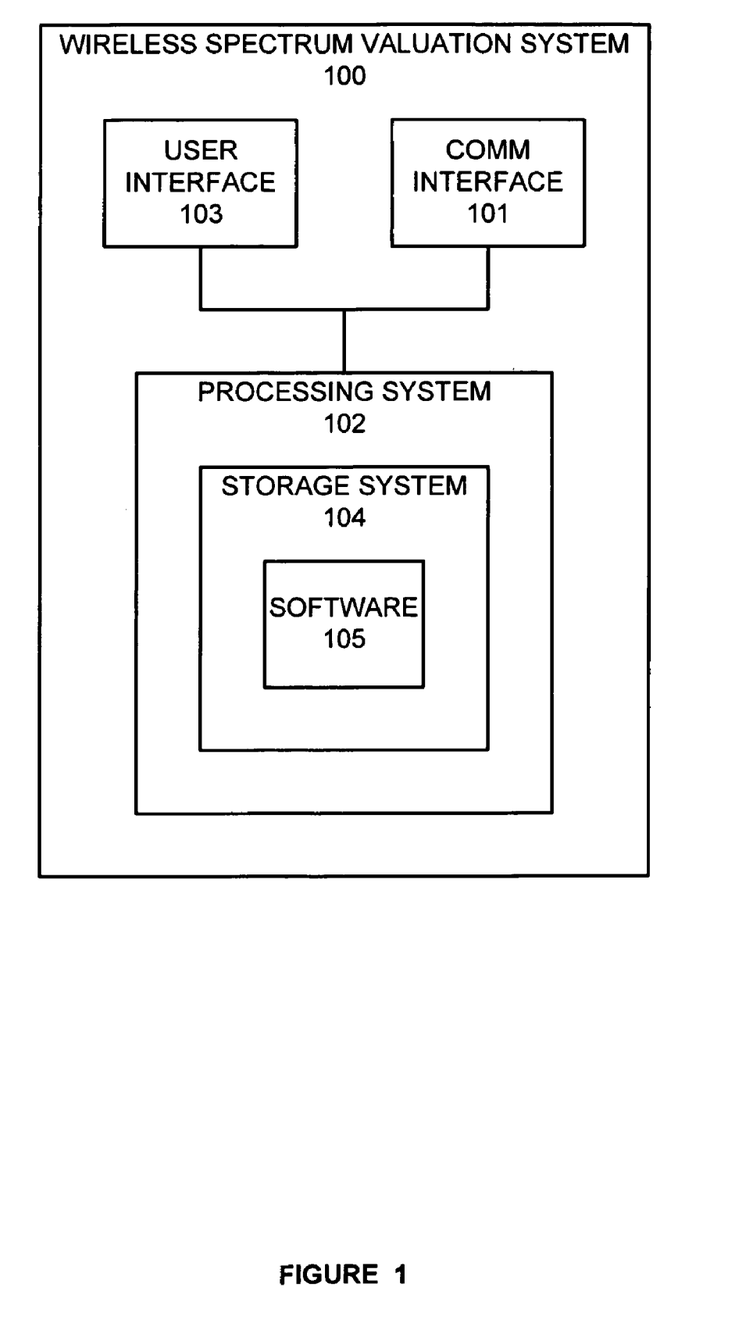
FIG. 1 is a block diagram that illustrates a wireless spectrum valuation system.

FIG. 1 is a block diagram that illustrates wireless spectrum valuation system 100. Wireless spectrum valuation system 100 includes communication interface 101, processing system 102, and user interface 103. Processing system 102 includes storage system 104. Storage system 104 stores software 105. Processing system 102 is linked to communication interface 101 and user interface 103. Wireless spectrum valuation system 100 could be comprised of a programmed general-purpose computer, although those skilled in the art will appreciate that programmable or special purpose circuitry and equipment may be used. Wireless spectrum valuation system 100 may be distributed among multiple devices that together comprise elements 101-105.

Communication interface 101 comprises a network interface, modem, port, transceiver, or some other communication device. Communication interface 101 may be distributed among multiple communication devices. Processing system 102 comprises a computer microprocessor, logic circuit, or some other processing device. Processing system 102 may be distributed among multiple processing devices. User interface 103 comprises a keyboard, mouse, voice recognition interface, microphone and speakers, graphical display, touch screen, or some other type of user device. User interface 103 may be distributed among multiple user devices. Storage system 104 comprises a disk, tape, integrated circuit, server, or some other memory device. Storage system 104 may be distributed among multiple memory devices.

Processing system 102 retrieves and executes software 105 from storage system 104. Software 105 may comprise an operating system, utilities, drivers, networking software, and other software typically loaded onto a computer system. Software 105 comprises an application program, firmware, or some other form of machine-readable processing instructions. When executed by processing system 102, software 105 directs processing system 102 to operate wireless spectrum valuation system 100 as described herein.

Figure 2:
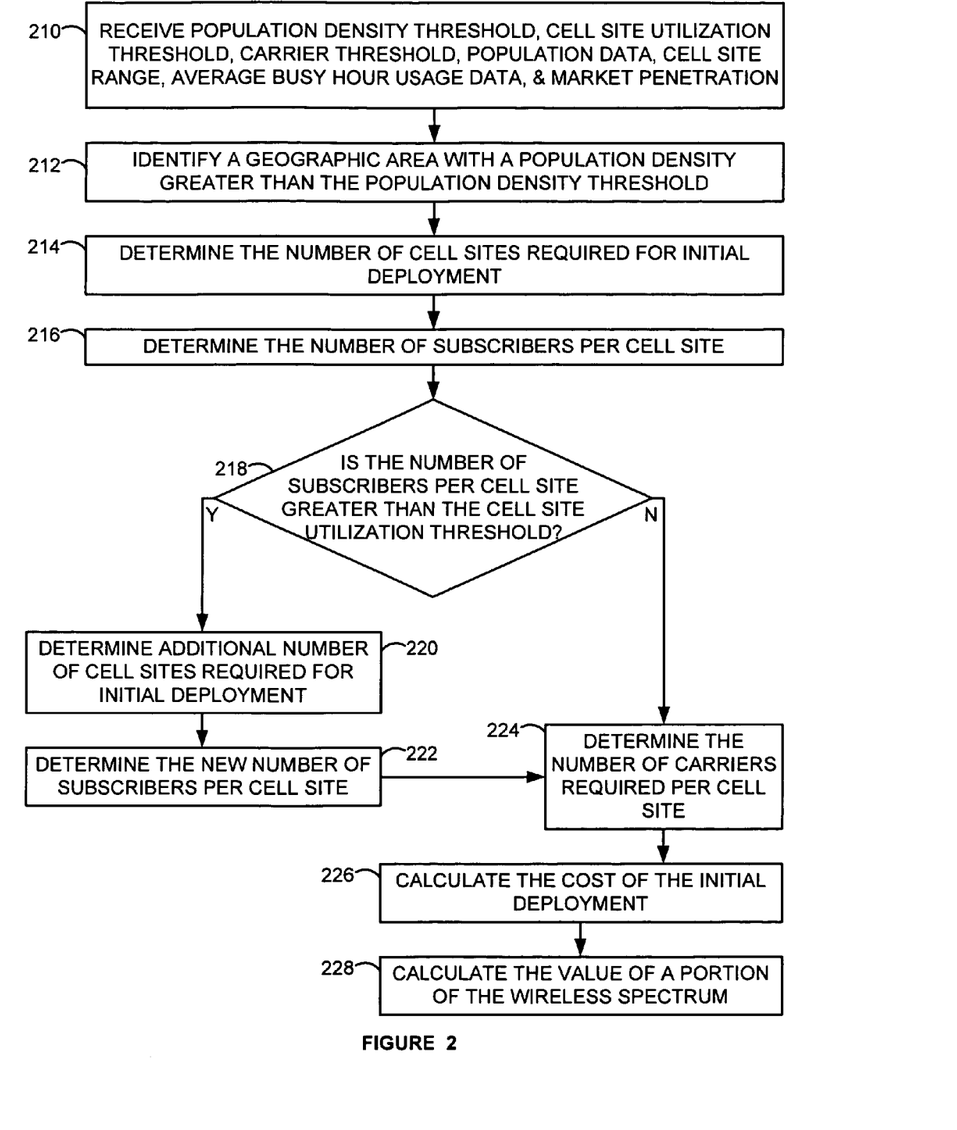
FIG. 2 is a flow diagram that illustrates the operation of a wireless spectrum valuation system.

FIG. 2 is a flow diagram that illustrates the operation of wireless spectrum valuation system 100. Input data is received by wireless spectrum valuation system 100 (operation 210). The input data may be received through user interface 103, communication interface 101, or a combination thereof. The input data comprises a population density threshold, a cell site utilization threshold, a carrier threshold, population data for various geographic areas, a cell site range, average busy hour usage data, and market penetration data for various geographic areas. The population density threshold is a minimum number of people per square-mile that is required for analysis. Geographic areas with a population density below that of the population density threshold will not be considered for analysis. The cell site utilization threshold is a maximum number of subscribers per cell site. The carrier threshold is a maximum number of average busy hour subscriber usage per carrier, wherein a carrier comprises a channel of a wireless spectrum. The population data comprises population, population density, demographics, and other census data by geographic area. The cell site range is the area in square-miles covered by a single cell site. Average busy hour usage data is the average traffic load during the peak hour of each day. Market penetration data is the percentage of the population that are subscribers by geographic area. During an initial deployment, the market penetration may be a forecasted market penetration based on similar subscriber areas and other relevant factors.

Processing system 102 processes the population data and the population density threshold to identify a geographic area that has a population density higher than the population density threshold (operation 212). Processing system 102 then determines the number of cell sites required for an initial deployment based on the size of the identified geographic area and the cell site range (operation 214). The initial deployment of cell sites must adequately cover the geographic area where the population density is higher than the population density threshold.

After processing system 102 determines the number of cell sites required for the identified geographic area, processing system 102 processes the market penetration, the population data, the size of the identified geographic area, and the number of cell sites required to determine a number of subscribers per cell site (operation 216). The actual number of subscribers per cell site will vary as subscribers move throughout the identified geographic area. However, the calculated number of subscribers per cell site is an average based on information about the population in the identified geographic area.

Processing system 102 then analyzes each proposed cell site to determine whether the number of subscribers per cell site is greater than the cell site utilization threshold (operation 218). If the number of subscribers per cell site is not greater than the cell site utilization threshold (operation 218), then the number of cell sites required for the identified geographic area is the total number of cell sites required for the initial deployment. If the number of subscribers per cell site is greater than the cell site utilization threshold (operation 218), then processing system 102 determines how many additional cell sites are required for the initial deployment (operation 220). The number of cell sites required for the identified geographic area plus the additional cell sites required to meet the cell site utilization threshold equals the total number of cell sites required for the initial deployment. Processing system 102 then recalculates the number of subscribers per cell site based on the total number of cell sites required for the initial deployment (operation 222).

After the total number of cell sites required for the initial deployment is determined, processing system 102 calculates the number of carriers required per cell site (operation 224). Processing system 102 then determines a cost of the initial deployment based on the total number of cell sites required and the number of carriers required (operation 226). Processing system 102 processes the cost of the initial deployment to determine a value for a wireless spectrum (operation 228).

Figure 3:
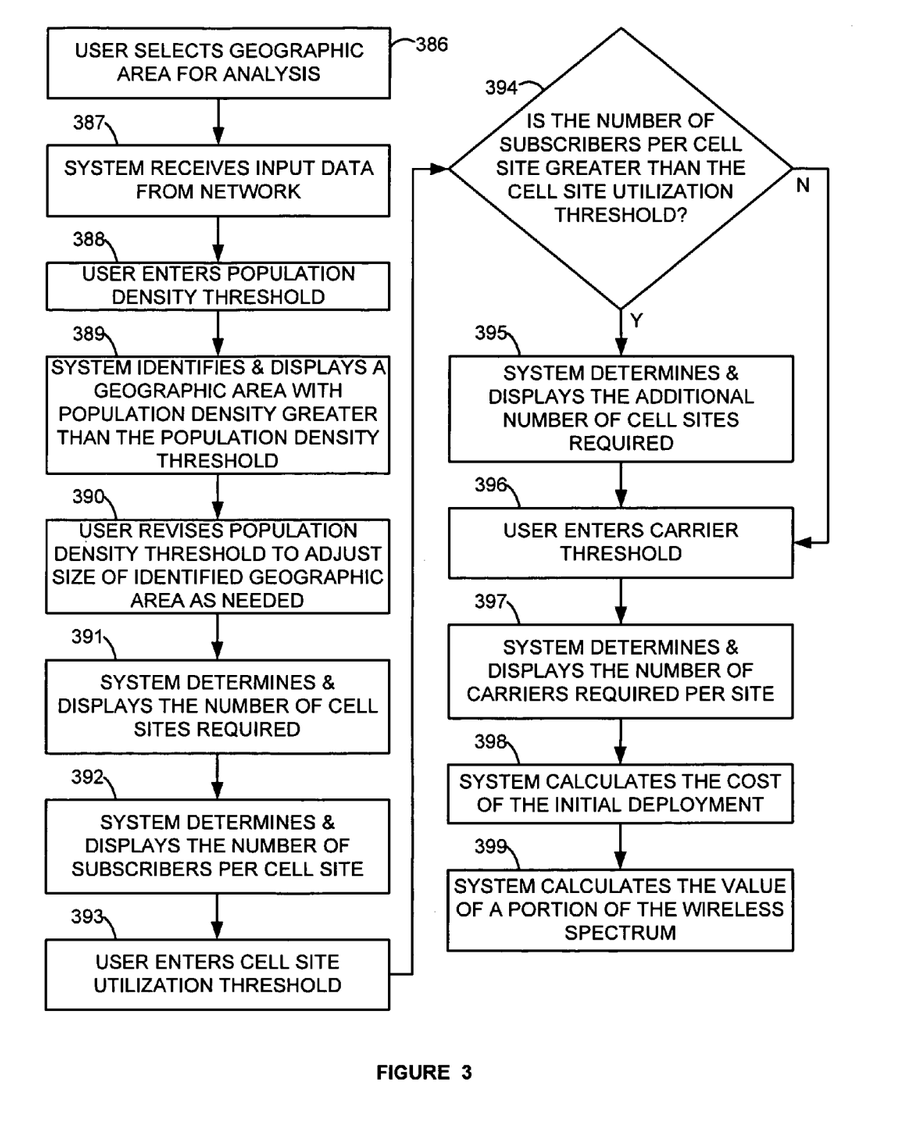
FIG. 3 is a flow diagram that illustrates the operation of a wireless spectrum valuation system.

FIG. 3 is a flow diagram that illustrates the operation of wireless spectrum valuation system 100 (from FIG. 1). First, a user (not shown) selects a geographic area for analysis through user interface 103 (operation 386). The user may select the geographic area by entering text, selecting from a list of options, highlighting a specific area on a map, or any other selection method. In some embodiments, a map is displayed on a screen and a user selects an area of the map for analysis. For example, if a map of the United States is displayed on the screen, then the user might draw a box around Kansas City in order to analyze Kansas City and the surrounding areas. Alternatively, the user may choose to analyze the entire map instead of a selected area of the map.

Wireless spectrum valuation system 100 then receives input data from a network (not shown) via communication interface 101 (operation 387). The input data may comprise a population data for the selected geographic area, a cell site range, average busy hour usage data, a carrier threshold, market penetration data, and any other information relevant to the analysis.

The user enters a population density threshold through user interface 103 (operation 388). The population density threshold is a user-defined number that indicates a minimum number of people per square mile.

Once the population density threshold is entered, processing system 102 processes the population density threshold and population data for the selected geographic area to identify and display regions of the geographic area with a population density greater than the population density threshold (operation 389).

The user may revise the population density threshold to adjust the size of the portions of the map that have a population density greater than the population density threshold (operation 390). For example, if a population density threshold of 750 people per square mile results in an area that is larger than the user wants to use for the initial deployment, then the population density threshold may be changed to 1000 people per square mile to reduce the size of the area with a population density greater than the population density threshold.

During the initial deployment, the user may enter a relatively high population density threshold so that the initial deployment is only in the most densely populated areas. For future expansion, the user may lower the population density threshold to expand coverage to less densely populated areas. For example, the initial deployment may occur only in urban areas where the population density is relatively high. Future deployments may then expand into suburban areas with a lower population density and then into rural areas with an even lower population density.

Next, processing system 102 determines and displays the number of cell sites required for each region based on the physical size of the region and the physical range of the cell sites (operation 391).

Processing system 102 then determines the number of subscribers per cell site based on market penetration data, population data, and cell site range (operation 392).

The user enters a cell site utilization threshold (operation 393). If the number of subscribers per cell site is greater than the cell site utilization threshold (operation 394), then additional cell sites may need to be added. For example, if the cell site utilization of a single cell site should not exceed 1200 subscribers, then additional cell sites would be added to the region until the number of subscribers per cell site is at or below 1200.

Processing system 102 determines and displays the additional cell sites required to meet the cell site utilization threshold (operation 395).

The number of subscribers per cell site may vary within one region. For example, the entire Kansas City metro area might be above the population density threshold, but the number of subscribers per cell site in the downtown area could be much higher than the surrounding areas. The system determines and displays additional cell sites as needed based on population density.

In some embodiments, the system displays the number of subscribers per cell site on the map.

Next, the user enters a carrier threshold (operation 396). Processing system 102 determines the number of carriers required per cell site (operation 397) based on the number of subscribers per cell site, the average busy hour usage per subscriber, and the carrier threshold. The number of carriers required must be determined for each individual cell site. In some embodiments, the system displays the number of carriers per cell site on the map.

Based on the total number of cell sites needed, the cost of deployment per cell site, the total number of carriers needed, and the cost of deployment per carrier, processing system 102 determines initial deployment costs for a specific region (operation 398).

The revenue, deployment costs and operating expenses are then processed to determine the value of a wireless spectrum as described above (operation 399).

At a high level, the value of a wireless spectrum ($V_s$) equals revenue (R) minus deployment costs (D) minus operating expenses (E).

$$V_s = R - D - E$$

In order to determine $V_s$, the revenue, deployment costs, and operating expenses must first be calculated. Revenue can be determined in a variety of ways. For example, revenue for a wireless telephone company in a specific geographic area could be determined by multiplying the company's market penetration (MP) in the geographic area by the total number of people (POP) in the area and then by the dollars earned per subscriber (I).

$$R = MP \times POP \times I$$

In an initial deployment, however, market penetration data is not available. The initial market penetration could be estimated in a variety of ways. For example, a market penetration estimate could be based on data from similar markets.

Operating expenses can be determined in a variety of ways. Operating expenses may be based on the maintenance costs per cell site, maintenance costs per carrier, and maintenance costs per subscriber. Other factors may also be used to determine operating expenses.

Deployment costs can be calculated in a variety of ways. The described system determines the costs associated with deploying a wireless communication network in a specific geographic area for the purpose of determining the value of a wireless spectrum.

FIGS. 4-9 illustrate examples of screenshots displayed by user interface 103 (from FIG. 1).

Figure 4:
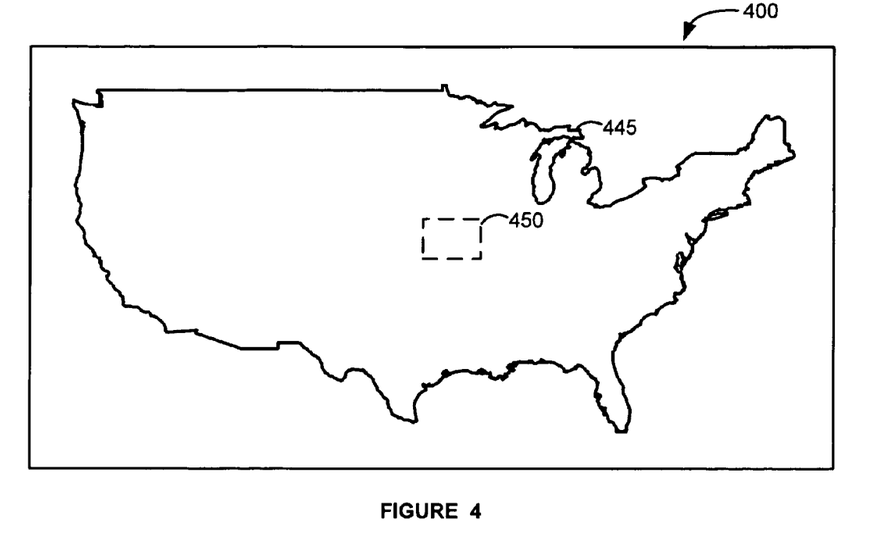
FIG. 4 is a display diagram that illustrates a graphical representation of a user interface.

Referring to FIG. 4, screen 400 comprises map 445. Screen 400 illustrates an example of a user selecting geographic area 450 for analysis by highlighting geographic area 450 on map 445.

Figure 5:
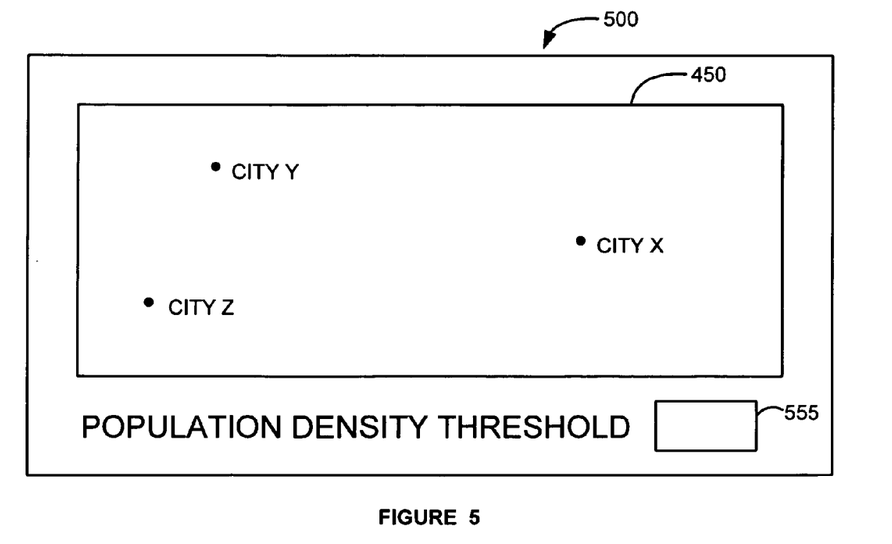
FIG. 5 is a display diagram that illustrates a graphical representation of a user interface.

Referring to FIG. 5, screen 500 comprises the previously selected geographic area 450 and population density threshold input field 555. The selected geographic area 450 comprises city X, city Y, and city Z. The user enters a population density threshold in people per square mile in population density threshold input field 555.

Figure 6A:
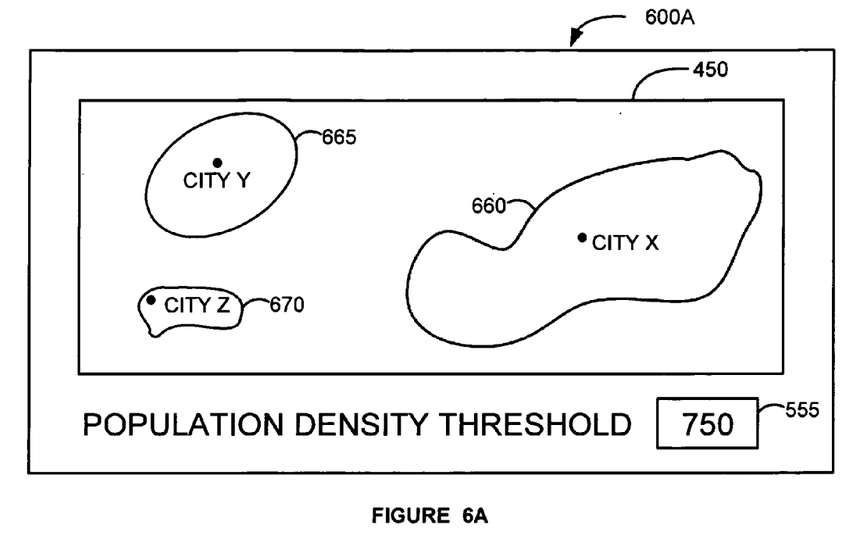
FIG. 6A is a display diagram that illustrates a graphical representation of a user interface.

Referring to FIG. 6A, screen 600A comprises geographic area 450 and population density threshold input field 555. Geographic area 450 comprises city X, city Y, city Z, region 660, region 665, and region 670. Screen 600A illustrates a user input of 750 people per square mile in population density threshold input field 555. The portions of geographic area 450 with a population density greater than 750 people per square mile are indicated on the map by regions 660, 665, and 670. If the user changes the population density threshold, then the indicated portions of the map will change accordingly.

Figure 6B:
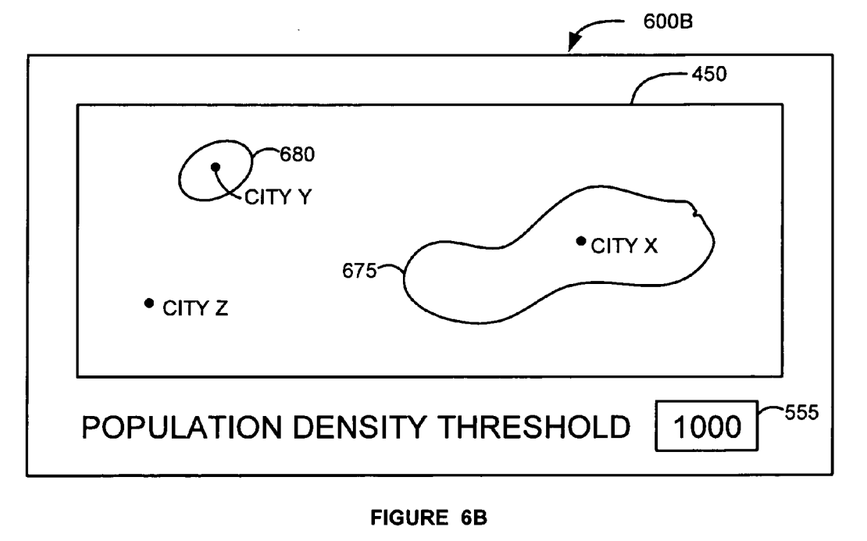
FIG. 6B is a display diagram that illustrates a graphical representation of a user interface.

Referring to FIG. 6B, screen 600B comprises geographic area 450 and population density threshold input field 555. Geographic area 450 comprises city X, city Y, city Z, region 675, and region 680. Screen 600B illustrates a user input of 1000 people per square mile in population density threshold input field 555. The population density threshold of 1000 results in smaller and fewer regions for the initial deployment than the example in FIG. 6A. Note that increasing the population density threshold from 750 to 1000 resulted in region 660 (in FIG. 6A) around city X changing to the smaller region 675. Similarly, region 665 (in FIG. 6A) around city Y changed to the smaller region 680. Region 670 (in FIG. 6A) around city Z does not have a population density above 1000. Regions 675 and 680 are the only portions of geographic area 450 with a population density greater than 1000 people per square mile.

Figure 7:
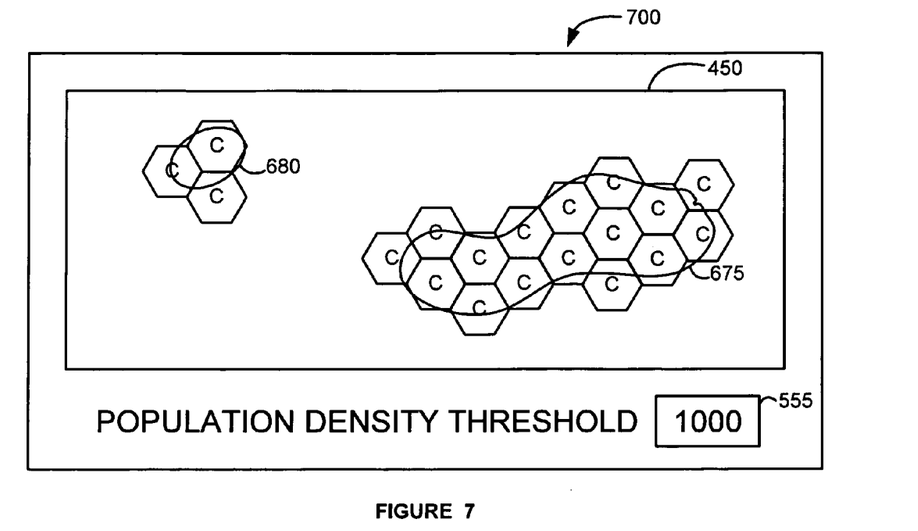
FIG. 7 is a display diagram that illustrates a graphical representation of a user interface.

Referring to FIG. 7, screen 700 comprises geographic area 450 and population density threshold input field 555. Geographic area 450 comprises region 675, region 680, and cell sites C. Screen 700 illustrates the cell sites C required for regions 675 and 680. The number of cell sites (C) could be determined in a variety of ways, such as by dividing the size of the region (S) by a cell site range (G).

$$C = S \div G$$

For example, region 675 might encompass 160 square miles, and each cell site C might cover 10 square miles. Thus, the system would display 16 cell sites C on the map covering region 675.

Figure 8:
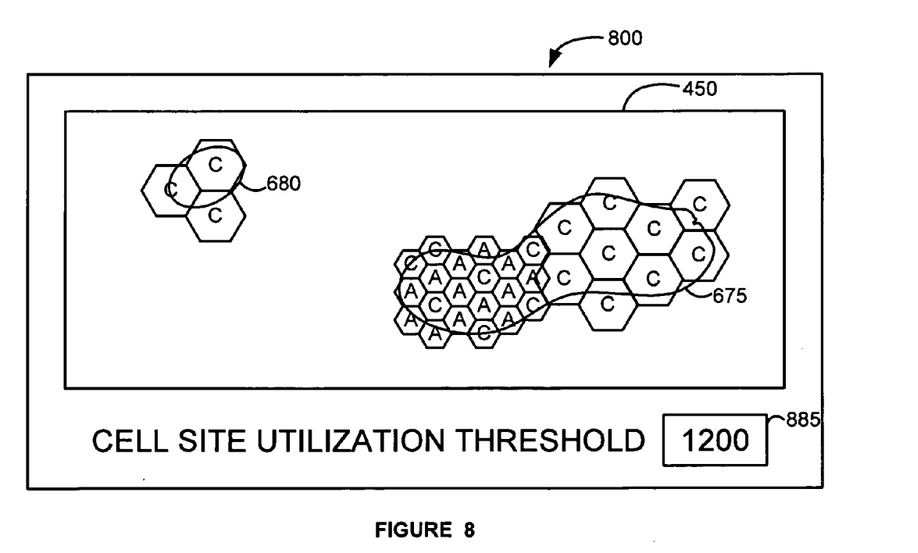
FIG. 8 is a display diagram that illustrates a graphical representation of a user interface.

Referring to FIG. 8, screen 800 comprises geographic area 450 and cell site utilization threshold input field 885. Geographic area 450 comprises region 675, region 680, cell sites C, and additional cell sites A. Screen 800 illustrates a user input of 1200 in cell site utilization threshold input field 885. In order to determine whether or not the cell site utilization threshold has been exceeded, the system must first calculate the number of subscribers per cell site.

The number of subscribers per cell site could be determined in a variety of ways. The number of subscribers per cell site ($S_c$) may be based on market penetration (MP), population density (PD), size of the region (S), and the number of cell sites (C). For example, the market penetration multiplied by the population density multiplied by the size of the region and then divided by the number of cell sites in the region would yield the number of subscribers per cell site.

$$S_c = (MP \times PD \times S) \div C$$

Continuing the previous example, assume the market penetration in region 675 is 50% and the population density is 1200 people per square mile. Thus, the number of subscribers per cell site in that region is 6000. As before, the market penetration may be forecasted for an initial deployment.

The system calculates the number of subscriber for each individual proposed cell site (MP×PD×G). If the number of subscribers for one cell site exceeds the cell site utilization threshold entered by the user in cell site utilization threshold input field 885, then the system determines the number of additional cell sites required to meet the cell site utilization threshold.

There are a variety of ways to determine the additional number of cell sites required ($C_a$). In one example, the additional number of cell sites required could be calculated by multiplying the market penetration (MP) by the population density (PD) by the size of the area (S) and then dividing by the cell site utilization threshold (U) and subtracting the original number of cell sites (C).

$$C_a = [(MP \times PD \times S) \div U] - C$$

In screen 800, cell sites A illustrate the additional cell sites required in region 675 in order to bring the number of subscribers per cell site below 1200. Note that only part of region 675 exceeded the cell site utilization threshold. The part of region 675 where the number of subscribers per cell site was less than the cell site utilization threshold was not changed.

Figure 9:
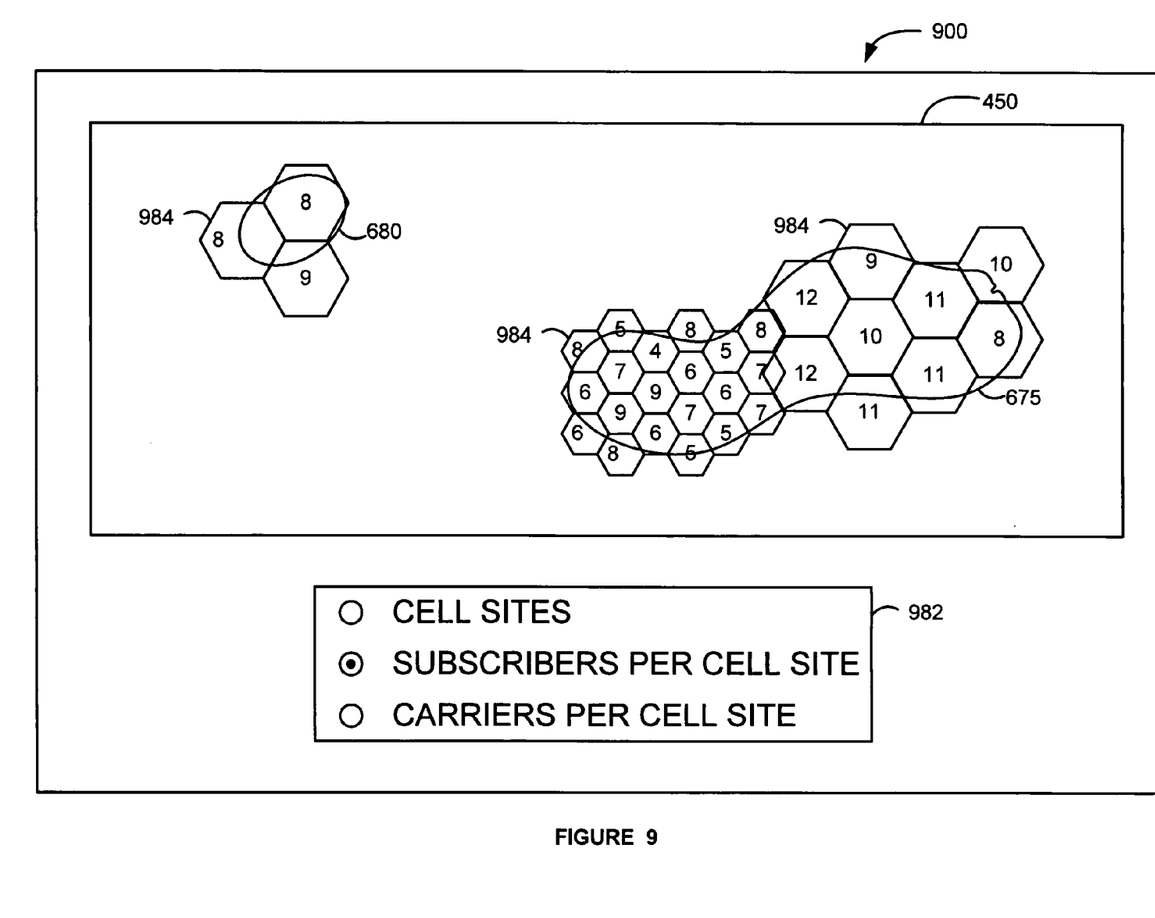
FIG. 9 is a display diagram that illustrates a graphical representation of a user interface.

Referring to FIG. 9, screen 900 comprises geographic area 450 and options 982. Geographic area 450 comprises region 675, region 680, and subscribers per cell site 984. Options 982 comprises cell sites, subscribers per cell site, and carriers per cell site. The user may select any of options 982 for viewing in geographic area 450. For example, if the user selects "subscribers per cell site" from options 982 (as illustrated in FIG. 9), then the numbers in cell sites 984 represent the number of subscribers in thousands in each cell site 984. Note that all proposed cell sites in geographic area 450 contain a number of subscribers per cell site, but not all have been labeled "984" in FIG. 9 for the sake of clarity. Options other than those shown in FIG. 9 may be available in options 982.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method operating a computer system to determine a value of a wireless spectrum, the method comprising:
   receiving input data comprising a population density threshold, a cell site utilization threshold, a carrier threshold, population data, a cell site range, average busy hour usage data, and market penetration data;
   processing the input data to identify and display a geographic area that has a population density greater than the population density threshold, calculating and displaying a number of cell sites required for an initial deployment in the identified geographic area, and calculating a first number of subscribers per cell site;
   if the first number of subscribers per cell site is greater than the cell site utilization threshold, then calculating and displaying an additional number of cell sites required for the initial deployment, and then calculating a second number of subscribers per cell site; and
   calculating a number of carriers required per cell site, calculating a cost of the initial deployment based on the number of cell sites required and the number of carriers required, and calculating and displaying the value of the wireless spectrum based on the cost of the initial deployment.

2. The method of claim 1 wherein receiving the input data comprises receiving the input data from a communication interface.

3. The method of claim 1 wherein receiving the input data comprises receiving the input data from a user interface.

4. The method of claim 1, further comprising displaying the number of carriers required per cell site.

5. The method of claim 1, further comprising displaying the first number of subscribers per cell site.

6. The method of claim 1, further comprising displaying the second number of subscribers per cell site.

7. The method of claim 1, further comprising receiving a user selection of a specific geographic area for analysis.

8. The method of claim 7 wherein receiving the selection of the specific geographic area for analysis comprises receiving a user selection of a portion of a map.

9. The method of claim 7 wherein receiving the selection of the specific geographic area for analysis comprises receiving a name of a city.

10. The method of claim 1 wherein the market penetration comprises a forecasted market penetration.

11. A computer system comprising:
    an interface configured to receive input data comprising a population density threshold, a cell site utilization threshold, a carrier threshold, population data, a cell site range, average busy hour usage data, and market penetration data;
    a processing system configured to process the input data to identify a geographic area having a population density greater than the population density threshold, calculate a number of cell sites required for an initial deployment in the identified geographic area, and calculate a first number of subscribers per cell site;
    if the first number of subscribers per cell site is greater than the cell site utilization threshold, then the processing system further configured to calculate an additional number of cell sites required for the initial deployment, and then calculate a second number of subscribers per cell site;
    the processing system further configured to calculate a number of carriers required per cell site, calculate a cost of the initial deployment based on the number of cell sites required and the number of carriers required, and calculate a value of a wireless spectrum based on the cost of the initial deployment; and
    the interface further configured to display the identified geographic area, display the cell sites required for the initial deployment, and display the value of the wireless spectrum.

12. The computer system of claim 11 wherein the interface comprises a communication interface.

13. The computer system of claim 11 wherein the interface comprises a user interface.

14. The computer system of claim 13 wherein the user interface is configured to display the number of carriers required per cell site.

15. The computer system of claim 13 wherein the user interface is configured to display the first number of subscribers per cell site.

16. The computer system of claim 13 wherein the user interface is configured to display the second number of subscribers per cell site.

17. The computer system of claim 13 wherein the user interface is configured to receive a user selection of a specific geographic area for analysis.

18. The computer system of claim 17 wherein the user interface is configured to receive a user selection of a portion of a map.

19. The computer system of claim 17 wherein the user interface is configured to receive a name of a city.

20. The computer system of claim 11 wherein the market penetration comprises a forecasted market penetration.

21. A non-transitory computer-readable medium having instructions stored thereon for operating a computer system to determine a value of a wireless spectrum, wherein the instructions, when executed by the computer system, direct the system to:
    receive input data comprising a population density threshold, a cell site utilization threshold, a carrier threshold, population data, a cell site range, average busy hour usage data, and market penetration data;
    process the input data to identify and display a geographic area having a population density greater than the population density threshold, calculate and display a number of cell sites required for an initial deployment in the identified geographic area, and calculate a first number of subscribers per cell site;

if the first number of subscribers per cell site is greater than the cell site utilization threshold, then calculate and display an additional number of cell sites required for the initial deployment, and then calculate a second number of subscribers per cell site; and calculate the number of carriers required per cell site, calculate a cost for the initial deployment based on the number of cell sites required and the number of carriers required, and calculate and display the value of the wireless spectrum based on the cost of the initial deployment.

22. The non-transitory computer-readable medium of claim 21, wherein the instructions direct the computer system to receive the input data from a communication interface.

23. The non-transitory computer-readable medium of claim 21, wherein the instructions direct the computer system to receive the input data from a user interface.

24. The non-transitory computer-readable medium of claim 21 wherein the instructions direct the computer system to display the number of carriers required per cell site.

25. The non-transitory computer-readable medium of claim 21, wherein the instructions direct the computer system to display the first number of subscribers per cell site.

26. The non-transitory computer-readable medium of claim 21, wherein the instructions direct the computer system to display the second number of subscribers per cell site.

27. The non-transitory computer-readable medium of claim 21 wherein the instructions direct the computer system to receive a user selection of a specific geographic area for analysis.

28. The non-transitory computer-readable medium of claim 27 wherein the instructions direct the computer system to receive a user selection of a portion of a map.

29. The non-transitory computer-readable medium of claim 27 wherein the instructions direct the computer system to receive a name of a city.

30. The non-transitory computer-readable medium of claim 21 wherein the market penetration comprises a forecasted market penetration.

\* \* \* \* \*